United States Patent
Schwartz et al.

(10) Patent No.: US 9,721,040 B2
(45) Date of Patent: Aug. 1, 2017

(54) MECHANISM TO INPUT, SEARCH AND CREATE COMPLEX DATA STRINGS WITHIN A SINGLE DIALOG

(75) Inventors: Daniel Schwartz, San Francisco, CA (US); Xia Liu, San Jose, CA (US); Djiao Mei Siauw, Redwood City, CA (US); Carolyn Luk, Hillsborough, CA (US); Scott Robinson, El Cerrito, CA (US); Charu Chandra, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 799 days.

(21) Appl. No.: 12/964,589

(22) Filed: Dec. 9, 2010

(65) Prior Publication Data
US 2012/0151411 A1 Jun. 14, 2012

(51) Int. Cl.
*G06F 3/00* (2006.01)
*G06F 17/30* (2006.01)
(Continued)

(52) U.S. Cl.
CPC ....... *G06F 17/30985* (2013.01); *G06Q 30/00* (2013.01); *G06F 3/0481* (2013.01)

(58) Field of Classification Search
CPC ....................................... G06F 3/0481–3/0489
(Continued)

(56) References Cited

U.S. PATENT DOCUMENTS 4,763,356 A * 8/1988 Day et al. ................. 379/368
5,692,173 A * 11/1997 Chew
(Continued)

OTHER PUBLICATIONS

FusionGPS: Design Patterns: Embedded Help Pattern Set: In-field Help Notes, Aug. 3, 2011 http://www.oracle.com/ocom/groups/public/@otn/documents/webcontent/447862.htm.*
(Continued)

*Primary Examiner* — Steven B Theriault
(74) *Attorney, Agent, or Firm* — Trellis IP Law Group, PC

(57) ABSTRACT

A mechanism and accompanying method adapted for use with a user interface for manipulating complex data strings. In an example embodiment, the method includes providing a dialog box that includes a first user option to input data pertaining to a complex data string; using data input pertaining to the complex data string to selectively verify that portions of the complex data string represent valid portions; providing a first user option via the dialog box to employ data input pertaining to the complex data string as one or more search criteria to selectively perform a search of preexisting complex data strings; and providing search results in response thereto, wherein the search results are displayed within the dialog box. In a specific embodiment, the method further includes providing a mechanism via the dialog box to trigger creation of a complex data string that a user has specified via the dialog box when search results for the complex data string to be created do not include a match. The complex data string includes a Key Flex Field (KFF) code employed in an Enterprise Resource Planning (ERP) software application. Hence, mechanisms for inputting, creating, searching, and displaying complex data strings may occur within a single dialog box.

20 Claims, 7 Drawing Sheets

(51) Int. Cl.
*G06Q 30/00* (2012.01)
*G06F 3/0481* (2013.01)

(58) Field of Classification Search
USPC ........................................................ 715/809
See application file for complete search history.

(56) References Cited

U.S. PATENT DOCUMENTS

| | | | | |
|---|---|---|---|---|
| 5,694,610 | A * | 12/1997 | Habib et al. | 715/210 |
| 5,798,757 | A * | 8/1998 | Smith | 715/709 |
| 5,838,965 | A * | 11/1998 | Kavanagh et al. | |
| 5,841,437 | A * | 11/1998 | Fishkin et al. | 345/619 |
| 5,845,300 | A * | 12/1998 | Comer et al. | 715/203 |
| 5,909,678 | A | 6/1999 | Bergman et al. | |
| 5,977,969 | A * | 11/1999 | DiAngelo | 715/780 |
| 5,983,219 | A * | 11/1999 | Danish et al. | |
| 6,008,810 | A * | 12/1999 | Bertram et al. | 715/809 |
| 6,011,555 | A * | 1/2000 | Eckhoff et al. | 715/843 |
| 6,084,585 | A * | 7/2000 | Kraft et al. | 715/733 |
| 6,275,821 | B1 * | 8/2001 | Danish et al. | |
| 6,366,299 | B1 * | 4/2002 | Lanning et al. | 715/738 |
| 6,564,213 | B1 * | 5/2003 | Ortega et al. | |
| 6,597,379 | B1 * | 7/2003 | Morris et al. | 715/781 |
| 6,728,706 | B2 * | 4/2004 | Aggarwal et al. | |
| 6,734,883 | B1 * | 5/2004 | Wynn et al. | 715/830 |
| 6,829,607 | B1 * | 12/2004 | Tafoya et al. | |
| 6,928,623 | B1 * | 8/2005 | Sibert | 715/783 |
| 6,947,928 | B2 * | 9/2005 | Dettinger et al. | |
| 7,131,069 | B1 * | 10/2006 | Rush et al. | 715/738 |
| 7,149,983 | B1 * | 12/2006 | Robertson et al. | 715/810 |
| 7,185,272 | B2 * | 2/2007 | Pearce et al. | 715/207 |
| 7,188,316 | B2 * | 3/2007 | Gusmorino et al. | 715/764 |
| 7,346,652 | B2 * | 3/2008 | Berrigan et al. | 709/203 |
| 7,359,858 | B2 * | 4/2008 | Gong et al. | 704/257 |
| 7,395,511 | B1 * | 7/2008 | Robertson et al. | 715/810 |
| 7,406,664 | B1 * | 7/2008 | Morton et al. | 715/809 |
| 7,451,397 | B2 * | 11/2008 | Weber et al. | 715/267 |
| 7,516,418 | B2 * | 4/2009 | Herley et al. | 715/816 |
| 7,665,030 | B2 * | 2/2010 | Sauermann et al. | 715/777 |
| 7,752,326 | B2 * | 7/2010 | Smit | 709/231 |
| 7,788,248 | B2 * | 8/2010 | Forstall et al. | 707/706 |
| 7,827,506 | B2 * | 11/2010 | Stier | 715/809 |
| 7,844,586 | B2 * | 11/2010 | von Duhn | G06Q 10/08 707/602 |
| 8,010,523 | B2 * | 8/2011 | Djabarov | 707/721 |
| 8,112,529 | B2 * | 2/2012 | van den Oord et al. | 709/227 |
| 8,120,547 | B2 * | 2/2012 | Seymour | G09F 19/12 345/1.1 |
| 8,185,529 | B2 * | 5/2012 | Forstall et al. | 707/736 |
| 8,255,871 | B1 * | 8/2012 | Kompella et al. | 717/108 |
| 8,285,739 | B2 * | 10/2012 | Dettinger et al. | 707/769 |
| 8,296,654 | B2 * | 10/2012 | Ahlberg et al. | 715/704 |
| 8,312,038 | B2 * | 11/2012 | Ceballos et al. | 707/769 |
| 8,332,377 | B2 * | 12/2012 | Kwak et al. | 707/706 |
| 8,332,772 | B2 * | 12/2012 | Janzen et al. | 715/771 |
| 8,438,148 | B1 * | 5/2013 | Rakowski | G06F 17/30864 707/706 |
| 8,793,612 | B2 * | 7/2014 | Keable | G06F 3/0489 715/767 |
| 2002/0036620 | A1 * | 3/2002 | Tervo | G06F 3/023 345/172 |
| 2002/0059297 | A1 * | 5/2002 | Schirmer et al. | 707/104.1 |
| 2002/0087568 | A1 * | 7/2002 | LeDonne et al. | 707/100 |
| 2002/0138445 | A1 * | 9/2002 | Laage et al. | 705/67 |
| 2003/0163455 | A1 * | 8/2003 | Dettinger et al. | 707/3 |
| 2003/0216979 | A1 * | 11/2003 | Sribhibhadh et al. | 705/30 |
| 2004/0015498 | A1 * | 1/2004 | Rabaioli | 707/9 |
| 2004/0015783 | A1 * | 1/2004 | Lennon et al. | 715/523 |
| 2004/0030602 | A1 * | 2/2004 | Rosenquist et al. | 705/22 |
| 2004/0030991 | A1 * | 2/2004 | Hepworth | G06F 17/243 715/226 |
| 2004/0059651 | A1 * | 3/2004 | MaGuire et al. | 705/30 |
| 2004/0080545 | A1 * | 4/2004 | Kobal et al. | 345/824 |
| 2004/0167833 | A1 * | 8/2004 | Schickler | 705/28 |
| 2004/0181461 | A1 * | 9/2004 | Raiyani et al. | 705/26 |
| 2005/0004911 | A1 * | 1/2005 | Goldberg et al. | 707/7 |
| 2005/0015363 | A1 * | 1/2005 | Dessloch et al. | 707/3 |
| 2005/0229096 | A1 * | 10/2005 | Kiesekamp et al. | 715/507 |
| 2005/0257167 | A1 * | 11/2005 | Fraleigh et al. | 715/809 |
| 2006/0048074 | A1 * | 3/2006 | Klein | 715/811 |
| 2006/0059434 | A1 * | 3/2006 | Boss et al. | 715/780 |
| 2006/0080301 | A1 * | 4/2006 | Cole | 707/3 |
| 2006/0206454 | A1 * | 9/2006 | Forstall et al. | 707/3 |
| 2006/0224995 | A1 * | 10/2006 | Treibach-Heck | G06F 3/0482 715/816 |
| 2007/0208993 | A1 * | 9/2007 | Ritter | G06F 17/248 715/234 |
| 2007/0300177 | A1 * | 12/2007 | Karas et al. | 715/780 |
| 2008/0019281 | A1 * | 1/2008 | Liger et al. | 370/252 |
| 2008/0066020 | A1 * | 3/2008 | Boss et al. | 715/968 |
| 2008/0162426 | A1 * | 7/2008 | Haug | G06F 17/3066 |
| 2008/0162542 | A1 * | 7/2008 | Chang | 707/102 |
| 2008/0208850 | A1 * | 8/2008 | Boyce | 707/6 |
| 2008/0222115 | A1 * | 9/2008 | Bonds | 707/3 |
| 2008/0243376 | A1 * | 10/2008 | Yokota et al. | 701/209 |
| 2008/0288530 | A1 * | 11/2008 | Flam et al. | 707/102 |
| 2009/0024604 | A1 * | 1/2009 | Zhao et al. | 707/5 |
| 2009/0024654 | A1 * | 1/2009 | Zhao et al. | 707/103 R |
| 2009/0043689 | A1 * | 2/2009 | Yang et al. | 705/38 |
| 2009/0048947 | A1 * | 2/2009 | Chorley | G06Q 10/087 705/28 |
| 2009/0083164 | A1 * | 3/2009 | Hull et al. | 705/27 |
| 2010/0088636 | A1 * | 4/2010 | Yerkes et al. | 715/809 |
| 2010/0318926 | A1 * | 12/2010 | Anderson | G06Q 40/12 715/763 |
| 2011/0191213 | A1 * | 8/2011 | Mora et al. | 705/30 |
| 2011/0246935 | A1 * | 10/2011 | Maeder | 715/809 |
| 2012/0144285 | A1 * | 6/2012 | Bach et al. | 715/221 |
| 2012/0220276 | A1 * | 8/2012 | Kobylarz | 455/414.1 |

OTHER PUBLICATIONS

Oracle.com et. al. "Using FlexFields for Custom Attributes" Release 11.1.4, 2012 p. 1-54.*
Oracle.com et. al. "Oracle applications FlexFields Guide Release 11 i" Jan. 2006.*
Oracle.com et al. FlexFields (Custom Fields) Oct. 12, 2003, pp. 1-25.*
Oracle Applications Flexfields Guide, Release 11; Mar. 1998; 395 pages.
Flexfields UI: Applications Usage Guideline; Version 2.0.0.0; Aug. 17, 2010; 43 pages.

* cited by examiner

Search and Select: DEPT

☐ Search

Match  ⦿ All  ○ Any  ← 92

DEPT  [Starts With ▽] ← 94

Description  [Contains ▽] ← 96

(Search) (Reset) ← 110

← 108

← 100  ← 102

| DEPT | Description |
|------|-------------|
| 0101 | Vision Car Sales |
| 0102 | Vision Part Sales |
| 0103 | Vision Car Mfg. |
| 0104 | Vision Financing |
| 0105 | Vision Services |

104 ⟶ (OK) (Cancel) 106

| | | | | | | | | | | |
|---|---|---|---|---|---|---|---|---|---|---|
| CO | CC | ACCT | PL | PRD | SUB | DEPT | REG | GEO | CT | DIV |
| 01 | 000 | 14500 | TRK | 10050 | ABC | 0101 | NE | EMA | EMA | 01 |
| 01 | 000 | 14500 | TRK | 10050 | DEF | 0102 | NW | EMB | EMB | 02 |
| 01 | 000 | 14500 | TRK | 10050 | GHI | 0103 | SE | EMC | EMC | 03 |
| 01 | 000 | 14500 | TRK | 10050 | JKL | 0104 | SW | EMD | EMD | 04 |
| 01 | 000 | 14500 | TRK | 10050 | MNO | 0105 | S | EME | EME | 05 |
| 01 | 000 | 14500 | TRK | 10050 | PQR | 0106 | W | EMF | EMF | 06 |

Account — Segments:
- CO: 01 — Vision Car Sales
- CC: 000 — Balance Sheet
- ACCT: 14500 — Prepaid Advertising
- PL: TRK — Trucks
- PRD:
- SUB:
- DEPT:
- REG:
- GEO:
- CT:

Search | Reset | OK | Cancel

MECHANISM TO INPUT, SEARCH AND CREATE COMPLEX DATA STRINGS WITHIN A SINGLE DIALOG

BACKGROUND

The present application relates to software and more specifically to user interface designs and methods for facilitating access to and implementation of functionality provided by underlying software.

Efficient user interface designs and accompanying methods are particularly important in enterprise applications, where inefficient or cumbersome user interfaces can create costly delays and require excessive use of scarce computing resources. For the purposes of the present discussion, an enterprise may be any organization of personnel and other resources. Examples of organizations include businesses, schools or universities, governments, non-profit organizations, and so on. Similarly, an enterprise application may be any software application designed for use by an enterprise, such as to facilitate running, managing, and/or documenting operations of the enterprise.

Enterprise software applications, such as Customer Relationship Management (CRM), Business Intelligence (BI), and Enterprise Resource Planning (ERP) software, often include databases with various database objects. A database object may be any collection of data, such as data pertaining to a particular financial account, asset, employee, contact, and so on. Examples of database objects include, but are not limited to, records, tables, or other database entities corresponding to accounts receivables, products, employees, customers, business resources, and so on.

Each database object may be associated with a particular identifier. Such identifiers may be complex data strings, also called codes. In certain enterprise applications, such identifiers may be specified by software end users. For the purposes of the present discussion, a complex data string may be any identifier that may include one or more segments, and which is used to identify a particular business entity or database object.

Conventionally, enterprise software applications that use complex data strings require users to navigate multiple dialog boxes (also simply called dialogs) or windows to manipulate complex data strings as desired. For example, searching for existing complex data strings; viewing search results; validating entered complex data strings; creating complex data strings; and so on, may require user interaction with multiple cumbersome dialog boxes, windows, and other user interface controls (e.g., buttons, fields, and so on). The requisite multiple user interface interactions may be both undesirably time consuming and computing-resource intensive.

SUMMARY

An example software user interface and accompanying functionality for facilitating specification, search, and creation of complex data strings includes a field that is adapted to enable a user to specify a complex data string or portion thereof. A first user interface control is positioned in proximity to the field and provides a first signal upon selection thereof by a user. A user interface dialog box is displayable in response to detection by the user interface of the first signal. The dialog box is adapted to display a portion of a complex data string entered via the field and to automatically indicate whether one or more segments of the portion of the complex data string are valid. The user interface dialog box further includes a search control that is adapted to employ one or more components of the portion of the complex data string as initial search criteria to trigger a search for matching preexisting complex data strings. The dialog box is adapted to automatically display any search results therein in response to user selection of the search control.

In a specific embodiment, the user interface dialog box is further adapted to facilitate entry of complex data strings or portions thereof and is further adapted to selectively display search results pertaining to an entered portion of a complex data string in response to user selection of the search control. In one operational mode, the user interface dialog box is further adapted to trigger creation of a complex data string by the software if a preexisting complex data string corresponding to an entered portion of a complex data string is not found by a search for a matching complex data string.

In a more specific embodiment, the complex data string includes a Key Flex Field (KFF) code with one or more code segments. The first user interface control, called a KFF widget, includes a button icon (butcon) positioned adjacent to the KFF. The KFF code or portion thereof, which is user specified via the KFF, includes segments separated by one or more predetermined separator characters, wherein the segments and contents thereof are displayed horizontally within the field.

For the purposes of the present discussion, a Key Flex Field (KFF) may be a field that is adapted to receive as input a particular type of complex data string, called a KFF code or KFF data string. KFF codes are often employed in ERP applications. A KFF code may refer to a particular type of customizable complex data string, which may include one or more code segments, where each code segment may refer, for example, to a different part of a serial number or to a portion of a description of a business entity. For example, an enterprise may choose to specify a part number by the following complex data string: BLU-NPAP-COMP-8×14, which may represent a blue notepad computer with 8"×14" dimensions. Various KFF code segments, e.g., BLU, NPAP, and COMP, are separated by separator characters, such as dashes. The exact types of characters used for separators and for segments are implementation specific and may vary among software applications.

The example dialog box contains vertically listed KFF segments, where each segment is displayed in a field with a corresponding drop-down list for selection of valid code segments. A search for valid code segments may also be triggered via a code-segment search control that is positioned in the drop-down list.

Each drop-down list may include a scroll bar. Scrolling via the scroll bar may cause any additional valid code segments to be fetched from a database for display in the drop-down list. Similarly, search results pertaining to searches for entire complex data strings may be displayed in combination with a scroll bar that facilitates dynamic fetching of results to be displayed in a display area of the dialog box.

Hence, certain embodiments disclosed herein may facilitate efficient access to functionality for entering, searching, and/or creating complex data strings or other identifiers of data objects via a single dialog box, which may be activated via a widget. Conventionally, separate windows or dialog boxes were activated to create, enter, and search for valid complex data strings. However, this was computationally expensive. Furthermore, user navigation of such dialog boxes and/or windows necessitated excessive clicks and other user input, which was particularly time consuming.

Certain embodiments disclosed herein provide streamlined user interfaces and accompanying methods for manipulating complex data strings in enterprise applications and other computing environments.

A further understanding of the nature and the advantages of particular embodiments disclosed herein may be realized by reference of the remaining portions of the specification and the attached drawings.

BRIEF DESCRIPTION OF THE DRAWINGS

FIG. 4 is a diagram of an example KFF-segment search dialog box, which may be activated from a code-segment drop-down list of FIGS. 2b, 2c, and 3.

FIG. 5 is a diagram illustrating display of search results in the dialog box of FIG. 3 after selection of an accompanying search button.

DETAILED DESCRIPTION OF EMBODIMENTS

Although the description has been described with respect to particular embodiments thereof, these particular embodiments are merely illustrative, and not restrictive.

While certain embodiments are discussed herein with respect to implementations involving use of Key Flex Fields (KFF) employed in certain Enterprise Resource Planning (ERP) software applications, embodiments are not limited thereto. For example, any software application that employs identifiers, such as complex data strings, for identifying database objects or other entities and that enables end users to specify, create, search for, and validate such identifiers, may benefit from user interfaces, functionality, and methods disclosed herein. For the purposes of the present discussion, functionality may refer to any collection of one or more functions or operational capabilities, such as capabilities or functions that are accessible or activatable via one or more user interface features.

For clarity, certain well-known components, such as special databases, operating systems, routers, power supplies, and so on, have been omitted from the figures. However, those skilled in the art with access to the present teachings will know which components to implement and how to implement them to meet the needs of a given application.

Figure 1:
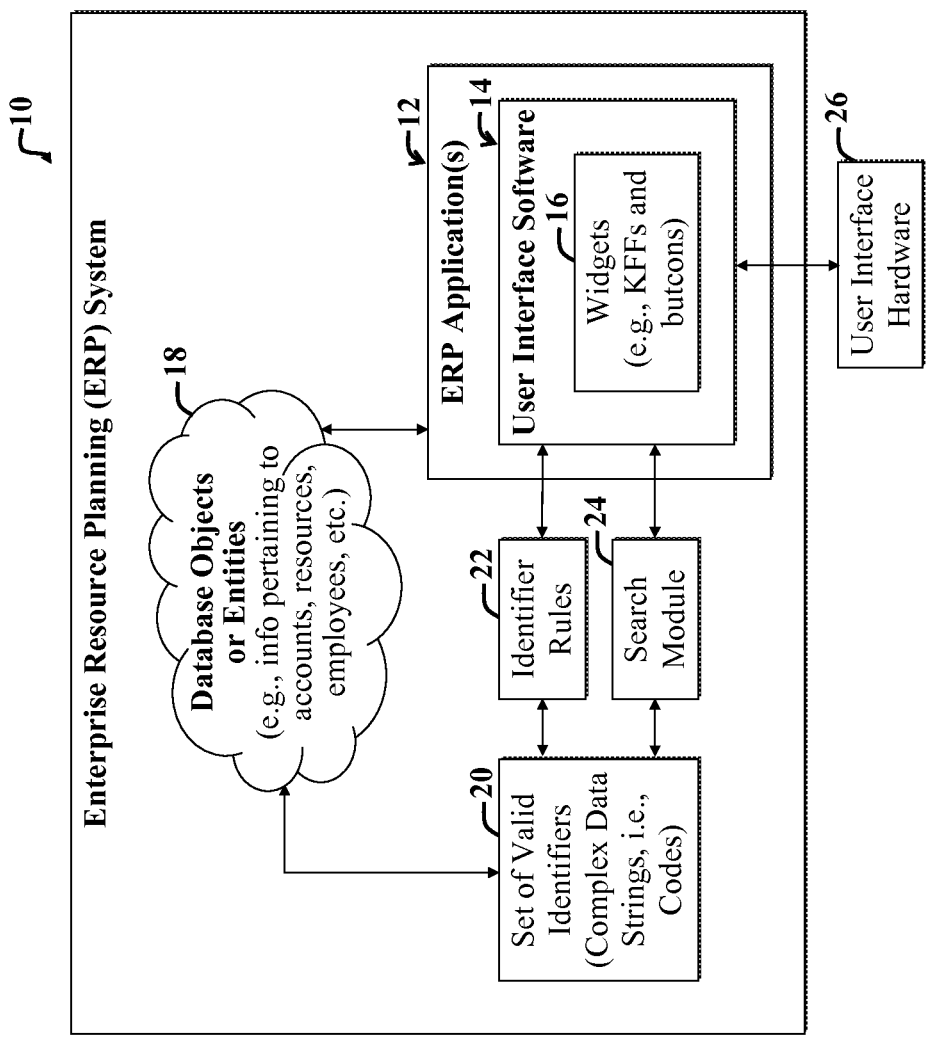
FIG. 1 is a diagram illustrating an example enterprise computing environment suitable for use with certain embodiments disclosed herein.

FIG. 1 is a diagram illustrating an example enterprise computing environment 10 that is suitable for use with certain embodiments disclosed herein. For illustrative purposes, the enterprise computing environment 10 is shown as an ERP system 10, which may include various enterprise applications running on one or more computers and/or networks.

The example ERP system 10 includes a set of one or more ERP applications 12, which may access various database objects, also called entities 18. For the purposes of the present discussion, a database object may be any collection of data. An entity may be any database object or may refer to anything that is described by data included in a database object. Examples of database objects include sets of data describing one or more business accounts, resources, employees, and so on. A database entity, such as an employee object, may refer to a collection of data describing a particular employee or other business entity.

Each database object 18 may be characterized or identified by an identifier, which is included among a set of valid identifiers 20. Valid identifiers may conform to a set of identifier rules 22, which may be accessible to one or more ERP applications 12 and accompanying user interface software 14. In general, identifiers discussed herein represent complex data strings. The complex data strings may include one or more segments, called code segments. Each code segment of a complex data string may describe a particular aspect of a particular database object or entity that is identified by the complex data string.

For the purposes of the present discussion, ERP software may be any set of computer code that is adapted to facilitate managing resources of an organization. Example resources include Human Resources (HR), financial resources, assets, employees, and so on, of an enterprise. The terms "ERP software" and "ERP application" may be employed interchangeably herein. However, an ERP application may include one or more ERP software modules or components, such as user interface software modules or components.

For illustrative purposes, the user interface software 14 running on the ERP application(s) 12 is shown including user interface widgets 16 for facilitating entering, selecting, creating, and validating complex data strings, and for facilitating access to one or more dialog boxes and accompanying controls for entering, selecting, creating, and/or validating one or more complex data strings, as discussed more fully below. The user interface software 14 communicates with the set of identifier rules 22, and a search module 24. The search module 24 is adapted to facilitate performing a query of the set of valid identifiers 20 in response to certain user input detected by the user interface software 14, as discussed more fully below. User interface hardware 26, such as a keyboard, mouse, monitor, and so on, communicates with the user interface software 14.

In operation, the ERP applications 12 may employ complex data strings to facilitate access to, validation of, and identification of database objects for use in various types of ERP software. The widgets 16, which may be implemented via Key Flex Field (KFF) widgets, may be positioned in tables, dialog boxes, and so on, in various software application display screens.

For the purposes of the present discussion, a KFF may be any field or user interface control that is adapted to enable a user to specify a complex data string or portion thereof. A user interface control may be any mechanism, such as a graphical representation or field, used to facilitate access to or use of functionality via a graphical user interface display screen. An icon, also called a butcon (for button icon) herein, may represent a specific type of control implemented as graphical representation corresponding to a user-selectable region of a user interface display screen, where user selection of the icon may enable user access to functionality associated therewith.

In one operative scenario discussed more fully below, a user may employ the user interface software 14 and widgets 16 to activate a dialog box. A single streamlined dialog box may be employed to facilitate using an entered portion of a complex data string to search for matching complex data strings via the search module 24. Search results are displayed within the dialog box in response to user selection of a search control, such as a search button. In one operational mode (called DINSERT mode), if an otherwise valid (i.e., conforms to identifier rules 22) complex data string (or one or more code segments thereof) is entered, but the complex data string or code segment(s) is not found among the set of valid identifiers 20, then the complex data string or code segment(s) is automatically created. A corresponding newly created complex data string object is then stored among the set of valid identifiers 20 of FIG. 1. Alternatively, the complex data string or portion thereof is created in response to predetermined user input, such as selection of a create button.

Figure 2A:
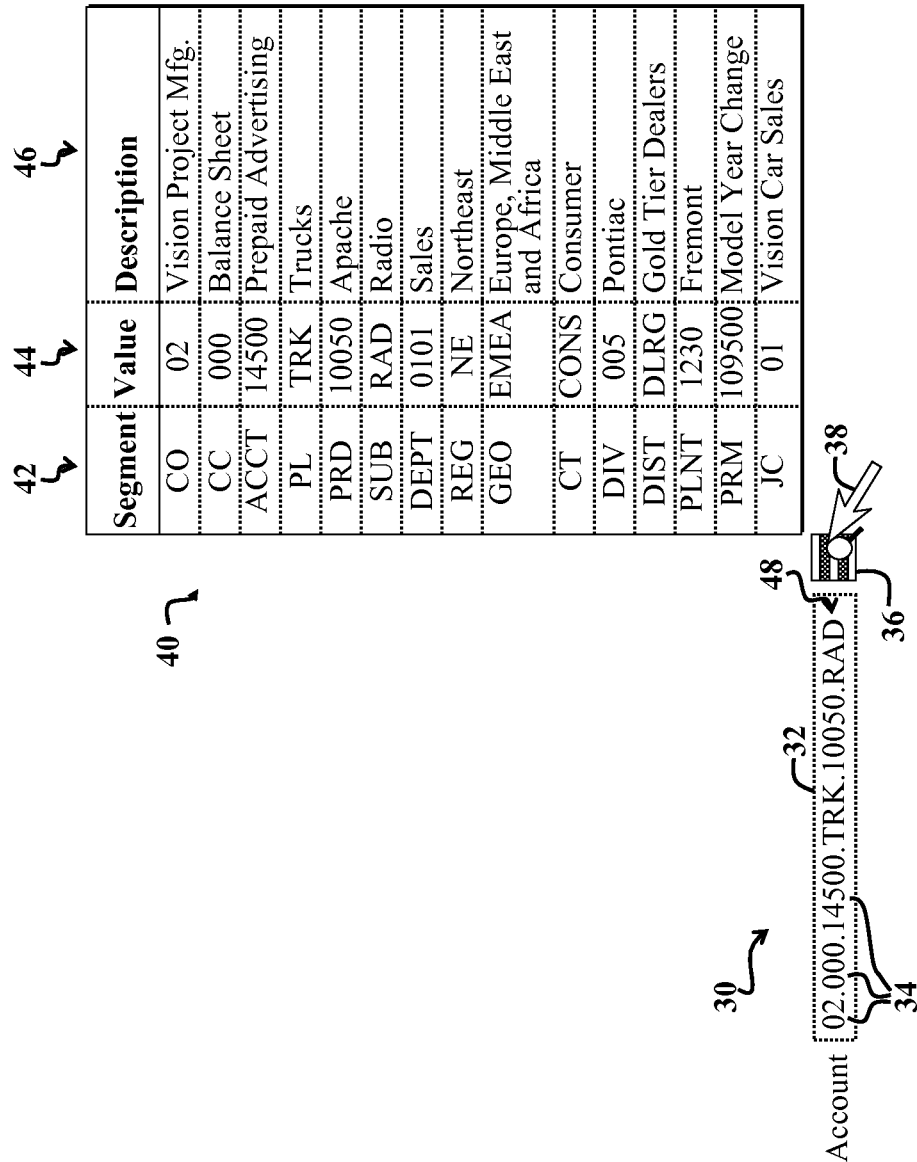
FIG. 2a is a diagram of a first example embodiment of a Key Flex Field (KFF) widget and accompanying hover layer.

FIG. 2*a* is a diagram of a first example embodiment of a Key Flex Field (KFF) widget 30 and accompanying hover layer 40. The present example KFF widget 30 includes a button icon (called a butcon) 36 and a KFF illustrated by a KFF boundary 32. The KFF includes an example complex data string 48 or portion thereof, which includes segments separated by separation characters, which in this case are periods. The example segments comprising the complex data string include 02, 000, 14500, TRK, 1050, RAD, and so on. Note that while periods are shown separating segments of the complex data string 48, other types of separators may be employed without departing from the scope of the present teachings. In general, allowable characters for code segments, separators, and so on are implementation specific and may vary depending upon the requirements of a particular implementation. Various rules governing specification of valid complex data strings may be maintained, for example, in the identifier rules module 22 of FIG. 1.

In the present example embodiment, the butcon 36 is adapted to display the hover layer 40 when the butcon 36 is "moused over" for a predetermined time interval. A mouse over of the butcon 36 occurs when a user positions a mouse pointer 38 over the butcon 36. Note that other or additional user input methods may be employed to activate the hover layer 40 without departing from the scope of the present teachings. For example, in certain implementations, the hover layer 40 will only appear upon "mouse over" of the butcon 36 when the code combination represented by the complex data string 48 represents a valid complex data string or portion thereof. In addition, in certain implementations, the hover layer 40 may automatically appear when a valid complex data string or portion thereof is entered within the KFF boundary 32.

The example hover layer 40 includes additional information pertaining to the entered complex data string 48. The hover layer includes a segment identification column 42, a segment value column 44, and a segment description column 46. The segment identification column 42 includes various abbreviated segment-type identifiers, such as "CO", which may stand for "Company." The segment-type identifiers 42 of the hover layer 40 and associated values 44 correspond to the values entered within the KFF boundary 32 of the widget 30. Note that particular segment-type identifiers used are implementation specific and may vary among software applications. Furthermore, in certain operational modes, abbreviated segment-type identifiers may be replaced with more complete identifiers as opposed to abbreviated identifiers. For example, an "ACCT" segment-type identifier may be replaced with "Account." Furthermore, while the hover layer 40 illustrates a substantially complete complex data string 48, partial data strings may be illustrated via the hover layer 40. In addition, in certain implementations, the hover layer 40 may automatically appear when a valid code combination for a complex data string is entered within the KFF boundary 32. Furthermore, various user interface controls, such as search buttons, drop-down lists, and so on may be added to the hover layer 40 without departing from the scope of the present teachings.

In certain implementations and/or operational modes, the widget 30 may be adapted to automatically create a complex data string from any complete valid code combination that is entered within the KFF boundary 32. For example if the entered complex data string 48 did not previously exist among the set of valid identifiers 20 of FIG. 1, then it may be automatically created and stored among the valid identifiers 20.

The segment value column 44 lists segment values adjacent to corresponding to segment-type identifiers provided in the segment column 42. Similarly, the segment description column 46 lists segment descriptions adjacent to corresponding segment values 44 and segment-type identifiers 42. Note that the first segment listed in the hover layer 40 is of type CO; has a value of 02, and pertains to a Vision Project Manufacturing. Similarly, the second segment is of type CC; has a value of 000, and pertains to a balance sheet, and so on. Such segment values, e.g., 02 and 000 are specified consecutively in the complex data string 48 in the KFF 32.

When a user selects the butcon 36, such as by double clicking or single clicking (depending upon the implementation) the butcon 36 via a mouse cursor 38, a dialog box is activated, as discussed more fully below. Note that the butcon 36 may be selected via other mechanisms (other than via a mouse), such as by tabbing twice or by entering another predetermined key, key combination, or sequence of keys. Exact mechanisms for selecting the butcon 36 may be implementation specific and may vary among implementations.

Figures 2B, 2C:
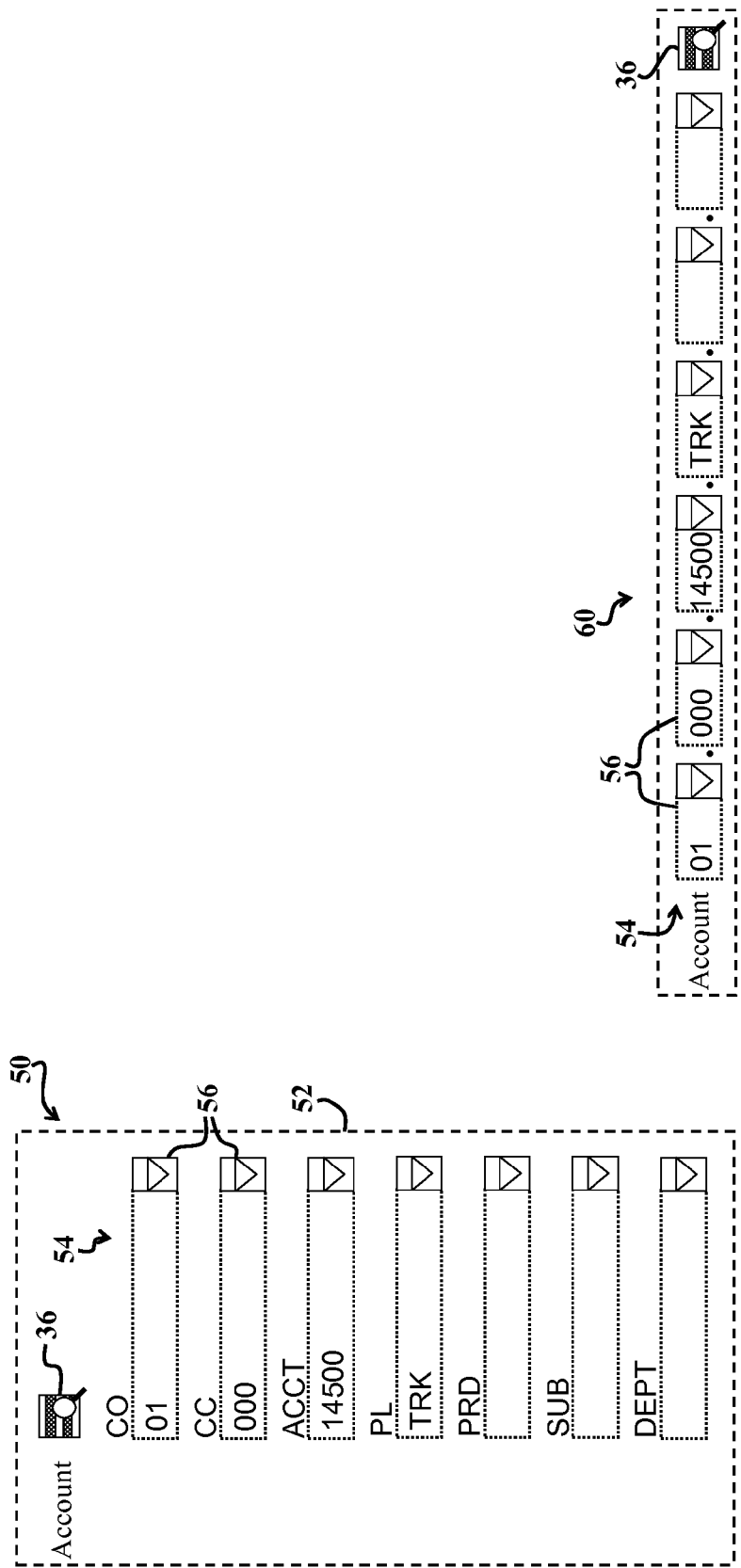
FIG. 2b is a diagram of a second example embodiment of a KFF widget, which includes vertically arranged KFF fields and accompanying drop-down lists for selecting values for KFF code segments.
FIG. 2c is a diagram of a third example embodiment of a KFF widget showing horizontally arranged fields and accompanying drop-down lists for KFF code segments.

FIG. 2*b* is a diagram of a second example embodiment of a KFF widget 50, which includes vertically arranged KFF segment fields 54 and accompanying drop-down lists 56 for selecting values for KFF code segments. The KFF segment fields 54 are within a widget boundary 52, which encompasses the butcon 36 and KFF segment fields 54. Note that the butcon 36 may be employed to activate a dialog box and/or to activate a hover layer, such as the hover layer 40 of FIG. 2*a*.

Each drop-down list 56 may include various valid candidate segments and may further include a user interface control for activating a search of code segments, as discussed more fully below. The various KFF segment fields 54 are labeled in accordance with the corresponding segment values displayed therein. In the present example embodiment, all KFF segment labels generally remain consistent between KFF widgets, hover layers, and any related dialog boxes.

FIG. 2*c* is a diagram of a third example embodiment of a KFF widget 60 showing horizontally arranged fields 54 and accompanying drop-down lists 56 for KFF code segments. The operation of various user interface controls, e.g., drop-down lists 56 and butcon 38 is similar to the corresponding user interface controls of the widget 50 FIG. 2*b*. Note that the KFF segment drop-down lists 56 may be arranged in a different pattern, i.e., other than horizontally or vertically, without departing from the scope of the present teachings.

Figure 3:
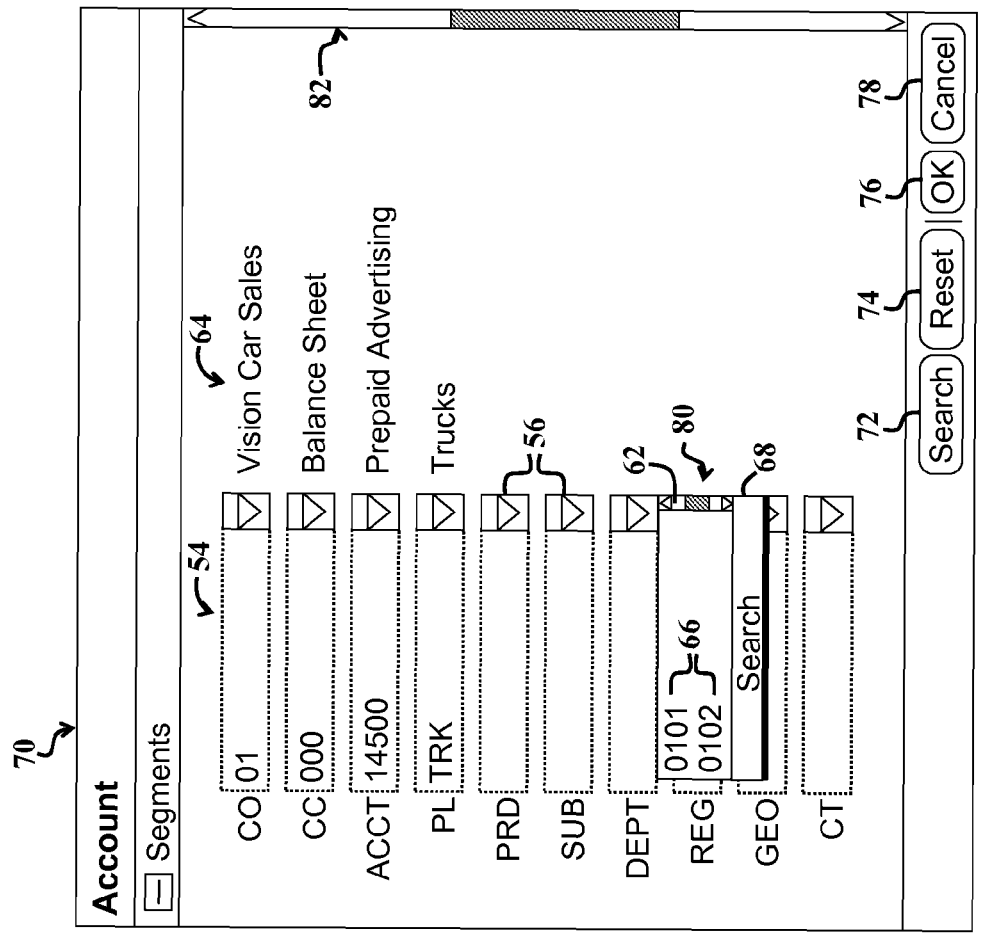
FIG. 3 is a diagram of a first example embodiment of a dialog box that may be activated via a butcon of the widgets of FIGS. 2a-2c.

FIG. 3 is a diagram of a first example embodiment of a dialog box 70 that may be activated via selection of the butcon 36 of the widgets 30, 50, 60 of FIGS. 2*a*-2*c*. For example, user selection of the butcon 36 of FIG. 2*a* may result in generation of a signal, wherein the user interface software 14 of FIG. 1 is adapted to cause display of the dialog box 70 in response to detection of the signal. The dialog box 70 may be used to validate, search, create, and enter complex data strings and associated segments.

In the present embodiment, the dialog box 70 is part of an application layer of the underlying software application that is used to display a complex-data-string widget, such as one of the KFF widgets 30, 50, 60 of FIGS. 2*a*-2*c*. Certain conventional user interfaces for manipulating complex data strings employed separate application windows for facilitating user manipulation of complex data strings. Such windows typically consumed more computing resources than would an application's dialog box. For the purposes of the present discussion, a dialog box may be a user interface window that is adapted to facilitate user interaction with a parent software application and that runs as a layer of the parent application.

The dialog box 70 includes a vertical listing of segment fields 54, which represent user interface controls with accompanying drop-down list controls 56. A corresponding list of segment descriptions 64 is positioned adjacent to the vertical listing of segment fields 54. When a given complex data string is estimated to have more possible components than those listable simultaneously in a particular display region of the dialog box 70, a dialog box scroll bar 82 is provided. The scroll bar 82 may be manipulated by a user, such as via the user interface hardware 26 of FIG. 1, to display other segment fields.

In the present embodiment, segments of the KFF field (e.g., KFF 32 of FIG. 2*a*) associated with the KFF widget (e.g., widget 30 of FIG. 2*a*) by which the dialog box 70 is activated, are parsed (e.g., but the user interface software 14 of FIG. 1) and vertically displayed via the segment fields 54. KFF separator characters may be used to facilitate parsing.

In the present operative scenario, a user has entered a partial complex data string in the KFF field 32 of FIG. 2*a*, where the first four segments were specified before activation of the dialog box 70 via the butcon 36 of FIG. 2*a*. Note however, that a user may employ the dialog box 70 and accompanying segment fields 54 to specify additional segments values; to change specified segment values, and so on. Any segments of a complex data string that have not already been user specified are shown as blank segment fields in the dialog box 70.

Activation of a given drop-down control 56 of a segment field 54 may yield an accompanying drop-down list to facilitate user entry, search, and/or selection of a valid segment value (also called code) for the segment field.

An example drop-down list 80 for a department (DEPT) segment is shown. The drop-down list 80 includes various example candidate segment codes 66 for various accounts. For illustrative purposes, the drop-down list 80 is shown including a drop-down list scroll bar 62. As the drop-down list scroll bar 62 is activated, additional candidate segment codes are fetched from storage (e.g., from the set of valid identifiers of FIG. 1) and displayed in the drop-down list 80 as needed.

The drop-down list 80 further includes a search button 68. Upon activation or selection of the search button 68, an additional dialog box for conducting a search for a suitable code segment may be launched, as discussed more fully below with reference to FIG. 4. Note that a user may also position a cursor in a segment field 54 and type a proposed segment value in the corresponding field 54.

In the present specific embodiment, when focus is removed from a particular segment field 54, the corresponding segment value specified in the segment field is automatically validated. Alternatively, segment fields are validated upon user selection of an OK button 76. If an entered segment value, i.e., code, does not conform to predetermined rules (e.g., as specified via the identifier rules 22 of FIG. 1) or is otherwise determined to be invalid, an alert box indicating that the segment value is invalid or is otherwise in error may appear. A user may then have the opportunity to enter a valid segment value.

Focus is said to be on a particular segment field 54 if the field is highlighted or otherwise selected. Focus is removed from a particular segment field 54 if the field is no longer highlighted or selected, such as when a different field or user interface control, field, or window is subsequently selected or highlighted.

The segment fields 54 may be adapted to display a hover layer, such as a hover layer that is similar to the hover layer 40 of FIG. 2*a*, upon a mouse over of a particular segment field for a predetermined length of time. Other methods or mechanisms for displaying hover layers may be employed without departing from the scope of the present teachings. For example, in certain implementations, hover layers may be displayed in response to detection of a predetermined combination or sequence of key strokes when a given user interface control is in focus.

In the present operative scenario, a user may select various buttons, such as a search button 72, a reset button 74, an OK button 76, and/or a cancel button 78. If a user selects the reset button 74, various entered segment values in the segment fields 54 may be blanked or otherwise reset, e.g., to predetermined default values. User selection of the cancel button 78 may cancel any changes to a complex data string or portion thereof made via the dialog box 70. User selection of the search button 72 may activate a search of preexisting complex data strings that match or are otherwise consistent with entered values in the segment fields 54. Any search results are displayed within the dialog box 70, which is dynamically resized to display a predetermined number of search results, as discussed more fully below.

With reference to FIGS. 1 and 3, in one operational mode, which may be called a DINSERT mode, user selection of the OK button 76 may trigger automatic creation (by the user interface software 14 of FIG. 1) of a new complex data string if the entered complex data string is not found among the set of preexisting complex data strings (e.g., the set 20 of FIG. 1) and conforms to the identifier rules 22.

The dialog box 70 and originating KFF widget (e.g., widgets 30, 50, 60 of FIGS. 2*a*-2*c*) may facilitate implementing a method that includes receiving a first user input via a user input field (e.g., the KFF field 32 of FIG. 2*a*), wherein the user input includes an identifier (e.g., complex data field) or portion of an identifier (e.g., one or more segments) corresponding to a preexisting database entity (e.g., preexisting account record) or a database entity to be created; opening a dialog box (e.g., the dialog box 70) in response to user selection of a first user interface control (e.g., the butcon 36 of FIG. 2*a*), wherein the first user interface control is positioned in proximity to the user input field (e.g., the KFF field 32 of FIG. 2a), wherein the dialog box is adapted to display one or more portions (e.g., segments) of any identifier provided by a user via the user input field; providing a user interface mechanism (e.g., search button) in association with the dialog box to trigger a search of one or more preexisting identifiers based on one or more portions of an identifier indicated in the dialog box; and displaying within the dialog box any search results pertaining to a triggered search.

The example method may further include automatically creating a particular identifier based on one or more portions of an identifier displayed in the dialog box when a search (which is triggered via the dialog box) for the particular identifier does not produce a match. Search results may be displayed in a section of the dialog box 70 that provides a scroll bar enabling a user to scroll through displayed search results and fetch search results from computer memory as needed as search results are scrolled, as discussed more fully below. The method may further include providing a user option (e.g., via the OK button 76) to create an identifier based on one or more portions of an identifier displayed in the dialog box when a search for a particular identifier does not produce a matching identifier.

FIG. 4 is a diagram of an example KFF-segment search dialog box 90, which may be activated from a code-segment drop-down list, such as such as the drop-down list 80 of FIG. 3. In general, similar drop-down lists may be activated via the drop-down controls 56 of the segment fields 54 of FIGS. 2b-3.

The example KFF-segment search dialog box 90 includes radio buttons 90 for choosing between a return of all matching search results or any matching search results. A segment-identifier control 94 is adapted to enable a user to enter search criterion pertaining to the segment-type identifier, e.g., DEPT. A description control 96 facilitates entering search criterion pertaining to a segment description. Search and reset buttons 110 facilitate triggering a search or resetting search criteria, respectively. Segment search results may be displayed via a listing 108. The segment search-results listing 108 includes a first column 100 for identifying segment values adjacent to a description column 102 for identifying corresponding segment descriptions. A user may select a search result from the displayed results listing 108 and may select OK 104 to employ the selected search result as the chosen segment. Alternatively, a user may select cancel 106, and the segment-search dialog box 90 will disappear without any changes having been made to the segment field and accompanying drop-down list from which the segment-search dialog box 90 was activated.

FIG. 5 is a diagram illustrating display of search results 120 in the dialog box 70 of FIG. 3 after selection of an accompanying search button 72. The dialog box 70' of FIG. 5 shown in FIG. 5 represents the dialog box 70 as shown in FIG. 5 after resizing to accommodate the search results 120, which occurs after a search has been conducted using initially input complex data string segments as search criteria.

After a search has been conducted, search results 120 are shown within the dialog box 70', where matching complex data strings are listed vertically, with their associated segments listed horizontally. Note that other arrangements of complex data string segments in search results are possible. A user may select one of the results, such as by double-clicking a row associated with a desired search result. Alternatively, a search result may be highlighted, and then the OK button 76 may be clicked to select the complex data string. In the search results 120 of FIG. 5, a third returned search result 122 is shown highlighted in preparation for selection thereof.

After a complex data string is selected from the results 120, the dialog box 70' may disappear, and the originating KFF widget (e.g., the widget 30, 50, 60 of FIGS. 2a-2c) will then illustrate the selected complex data string, such as in the KFF field 32 of FIG. 2a.

In the present embodiment, a user may activate a search-results scroll bar 124 to view search results not initially displayed among the search results 120. Any additional search results viewed via scrolling will be dynamically, i.e., automatically fetched from computer memory as needed.

Figure 6:
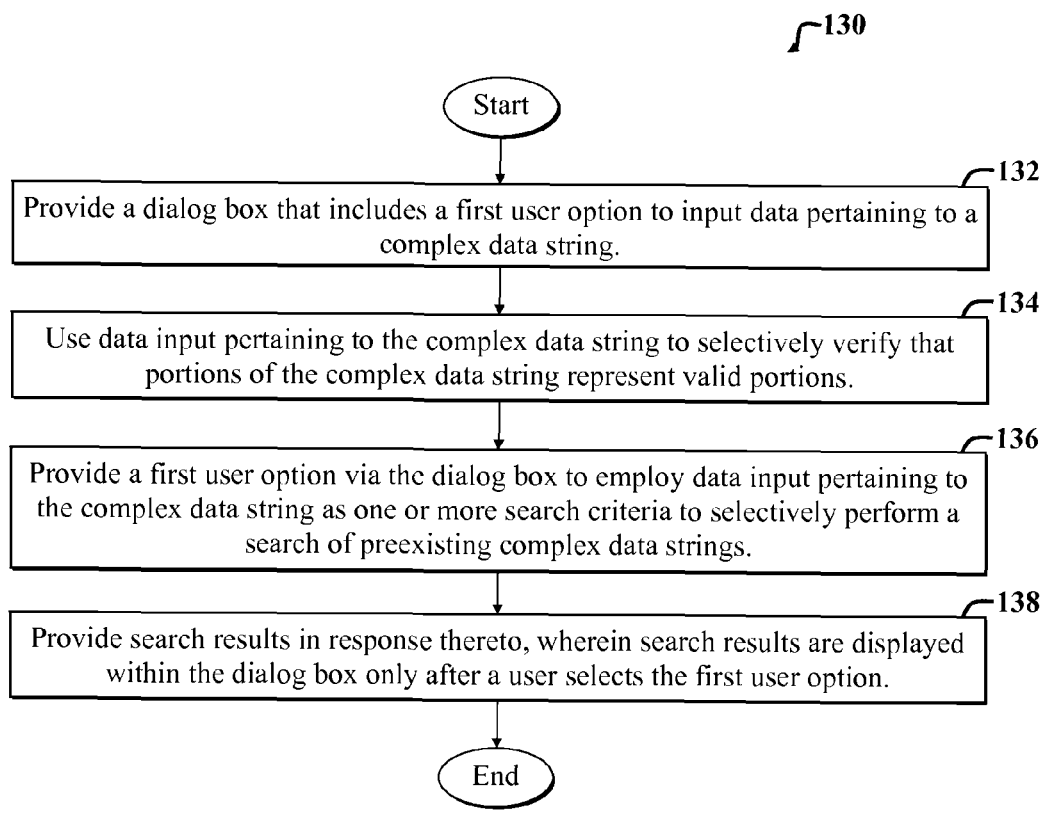
FIG. 6 is a flow diagram of an example method that is adapted for use with the embodiments of FIGS. 1-5.

FIG. 6 is a flow diagram of an example method 130 that is adapted for use with the embodiments of FIGS. 1-5. An example first step 132 includes providing a dialog box that includes a first user option to input data pertaining to a complex data string.

A second step 134 includes using data input pertaining to the complex data string to selectively verify that portions of the complex data string represent valid portions.

A third step 136 includes providing a first user option via the dialog box to employ data input pertaining to the complex data string as one or more search criteria to selectively perform a search of preexisting complex data strings.

A fourth step 138 includes providing search results in response thereto, wherein the search results are displayed within the dialog box.

Note that additional, different, and/or fewer steps than those shown in FIG. 6 may be included without departing from the scope of the present teachings. For example, the method 130 may further include providing a mechanism via the dialog box to trigger creation of a complex data string that a user has specified via the dialog box when search results for the complex data string to be created do not include a match.

The complex data string may include a Key Flex Field (KFF) code employed in an Enterprise Resource Planning (ERP) software application. An alternative method may further include providing a widget that includes a field for receiving a complex data string or portion thereof as input. The widget may further include a user interface control (e.g., butcon) that is adapted to open the dialog box upon user selection of the user interface control.

The alternative method may further including employing the complex data string or portion thereof that is specified by a user via the field to populate data displayed via the dialog box with one or more components of a complex data string or portion thereof. The one or more components may include one or more segments of a Key Flex Field code (KFF).

The alternative method may further include displaying the one or more segments via user interface components that are arranged vertically within the dialog box, and providing one or more additional user interface controls that are adapted to enable a user to specify one or more additional segments of a KFF code associated with one or more code segments that have already been provided by a user for display via the dialog box.

A second example alternative method includes receiving a first user input via a user input field, wherein the user input includes an identifier or portion of an identifier corresponding to a preexisting database entity or a database entity to be created; opening a dialog box in response to user selection of a first user interface control, wherein the first user interface control is positioned in proximity to the user input field, wherein the dialog box is adapted to display one or more portions of any identifier provided by a user via the user input field; providing a user interface mechanism in association with the dialog box to trigger a search of one or more preexisting identifiers based on one or more portions of an identifier indicated in the dialog box; displaying within the dialog box any search results pertaining to a triggered search; and creating an identifier based on one or more portions of an identifier displayed in the dialog box, when a search, triggered via the dialog box, for a particular identifier does not produce a match.

A third example alternative method includes receiving a first user input via a user input field, wherein the user input includes an identifier or portion of an identifier corresponding to a preexisting database entity or a database entity to be created; opening a dialog box in response to user selection of a first user interface control, wherein the first user interface control is positioned in proximity to the user input field, wherein the dialog box is adapted to display one or more portions of any identifier provided by a user via the user input field; providing a user interface mechanism in association with the dialog box to trigger a search of one or more preexisting identifiers based on one or more portions of an identifier indicated in the dialog box; displaying within the dialog box any search results pertaining to a triggered search; and creating an identifier based on one or more portions of an identifier displayed in the dialog box, when a search, triggered via the dialog box, for a particular identifier does not produce a match.

While the present discussion has focused on user interfaces and accompanying methods for manipulating complex data strings, such as KFF codes, embodiments are not limited thereto. Furthermore, while certain user interface screens have been shown displaying user interface controls in a particular arrangement, arrangements of user interface controls are not limited to those shown. Additional or fewer components, e.g., user interface controls may be provided in various user interface display screens discussed herein without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method adapted for use with a user interface, the method comprising:

receiving a signal generated from a butcon of a widget of the user interface, wherein the signal is generated in response to a user input device, wherein the butcon is a button icon adjacent to a Key Flex Field (KFF);

displaying a dialog box of the user interface in response to receiving the signal generated from the butcon;

accepting signals, at the dialog box, from the user input device to input an input complex data string into a single user interface field, of the dialog box, responsive to the accepted signals, wherein the input complex data string represents a database object which is characterized by an identifier structured to conform to a set of identifier rules, wherein the input complex data string includes two or more segments, wherein one or more separators are used to separate the two or more segments;

automatically performing a search, at the dialog box, for a segment of the two or more segments while the input complex data string is being input;

automatically validating that the segment, of the two or more segments, conforms to the set of identifier rules while the input complex data string is being input to the dialog box;

if the input complex data string matches a preexisting complex data string conforming to the identifier, then automatically displaying initial search results, in the dialog box, from using at least a portion of the input complex data string;

dynamically resizing the dialog box to display the initial search results;

upon determining that the segment of the two or more segment does not match a corresponding segment of a preexisting complex data string conforming to the set of identifier rules, then automatically storing the input complex data string, from the dialog box, as a new identifier conforming to the set of identifier rules;

fetching from computer memory additional search results that were not initially displayed, wherein the fetching is performed in response to a scroll bar of the dialog box;

displaying the additional search results in the dialog box;

receiving selection of a particular complex data string from search results including the initial search results and the additional search results; and in response to the selection, displaying the particular complex data string in the widget and removing the dialog box from the user interface.

2. The method of claim 1, wherein a mechanism is adapted to enable a user to trigger creation of the input complex data string when search results for the input complex data string do not include a match.

3. The method of claim 2, further comprising:
displaying a search control; and
displaying search results only after user selection of the search control.

4. The method of claim 2, further comprising:
allowing a user to scroll to view search results; and
fetching the additional search results from computer memory for display via the dialog box as a user employs a scroll mechanism of the dialog box to display the additional search results.

5. The method of claim 2, wherein the input complex data string includes a Key Flex Field (KFF) code employed in an Enterprise Resource Planning (ERP) software application.

6. The method of claim 2, further including providing a widget that includes a field for receiving the input complex data string or portion thereof as input.

7. The method of claim 6, wherein the widget further includes a user interface control that is adapted to open the dialog box upon user selection of the user interface control.

8. The method of claim 7, further including selectively displaying a hover layer in proximity to the widget, wherein the hover layer displays information pertaining to the input complex data string or portion thereof that is entered in the field of the widget.

9. The method of claim 7, further including employing the input complex data string or portion thereof that is specified by a user via the field to populate data displayed via the dialog box with one or more components corresponding to the input complex data string or portion thereof.

10. The method of claim 9, wherein the one or more components include one or more segments of a Key Flex Field (KFF) code.

11. The method of claim 10, further including displaying the one or more segments via user interface components that are arranged vertically within the dialog box.

12. The method of claim 10, further including providing one or more additional user interface controls that are adapted to enable a user to specify one or more additional segments of a KFF code associated with one or more code segments that have already been provided by a user for display via the dialog box.

13. The method of claim 10, wherein the field for receiving the input complex data string includes the Key Flex Field (KFF), wherein the input complex data string or portion thereof specified via the Key Flex Field (KFF) includes segments separated by one or more predetermined separator characters, wherein the segments and contents thereof are displayed horizontally within the field.

14. The method of claim 13, wherein the field is adapted to respond to one or more predetermined key strokes by triggering validation of a user specified complex data string or portion thereof that is specified via the field, in response to detection by software of a first instance of the one or more predetermined key strokes when the field is selected by a user.

15. The method of claim 13, further including providing a user option to display a hover layer in response to one or more predetermined user input actions.

16. The method of claim 7, wherein the dialog box is adapted to parse a user specified complex data string or portion thereof in accordance with one or more separator characters included in the input complex data string specified in the field of the widget, and is adapted to vertically list segments of the input complex data string or portion thereof via one or more segment fields.

17. The method of claim 16, wherein the one or more segment fields include one or more drop-down lists.

18. The method of claim 17, wherein the one or more drop down lists include one or more segment search controls, wherein the one or more segment search controls are adapted to trigger the dialog box adapted to facilitate searching for a particular segment of the input complex data string in a database.

19. An apparatus comprising:
one or more processors; and
logic encoded in one or more-computer-readable storage media for execution by the one or more processors and when executed operable to:
receiving a signal generated from a butcon of a widget of a user interface, wherein the signal is generated in response to a user input device;
displaying a dialog box of the user interface in response to receiving the signal generated from the butcon;
accepting signals, at the dialog box, from the user input device to input an input complex data string into a single user interface field, of the dialog box, responsive to the accepted signals, wherein the input complex data string represents a database object which is characterized by an identifier structured to conform to a set of identifier rules, wherein the input complex data string includes two or more segments, wherein one or more separators are used to separate the two or more segments;
automatically performing a search, at the dialog box, for a segment of the two or more segments while the input complex data string is being input;
automatically validating that the segment, of the two or more segments, conforms to the set of identifier rules while the input complex data string is being input to the dialog box;
if the input complex data string matches a preexisting complex data string conforming to the identifier, then automatically displaying initial search results, in the dialog box, from using at least a portion of the input complex data string;
dynamically resizing the dialog box to display the initial search results;
upon determining that the segment of the two or more segments does not match a corresponding segment of a preexisting complex data string conforming to the set of identifier rules, then automatically storing the input complex data string, from the dialog box, as a new identifier conforming to the set of identifier rules;
fetching from computer memory additional search results that were not initially displayed, wherein the fetching is performed in response to a scroll bar of the dialog box;
displaying the additional search results in the dialog box;

receiving selection of a particular complex data string from search results including the initial search results and the additional search results; and in response to the selection, displaying the particular complex data string in the widget and removing the dialog box from the user interface.

20. An apparatus comprising:

a digital processor coupled to a display screen and to a processor-readable storage device, wherein the processor-readable storage device includes one or more instructions executable by the digital processor to perform the following acts:

receiving a signal generated from a butcon of a widget of user interface, wherein the signal is generated in response to a user input device;

displaying a dialog box of the user interface in response to receiving the signal generated from the butcon;

accepting signals, at the dialog box, from the user input device to input an input complex data string into a single user interface field, of the dialog box, responsive to the accepted signals, wherein the input complex data string represents a database object which is characterized by an identifier structured to conform to a set of identifier rules, wherein the input complex data string includes two or more segments, wherein one or more separators are used to separate the two or more segments;

automatically performing a search, at the dialog box, for a segment of the two or more segments while the input complex data string is being input;

automatically validating that the segment, of the two or more segments, conforms to the set of identifier rules while the input complex data string is being input to the dialog box;

if the input complex data string matches a preexisting complex data string conforming to the identifier, then automatically displaying initial search results, in the dialog box, from using at least a portion of the input complex data string;

dynamically resizing the dialog box to display the initial search results;

upon determining that the segment of the two or more segments does not match a corresponding segment of a preexisting complex data string conforming to the set of identifier rules, then automatically storing the input complex data string, from the dialog box, as a new identifier conforming to the set of identifier rules;

fetching from computer memory additional search results that were not initially displayed, wherein the fetching is performed in response to a scroll bar of the dialog box;

displaying the additional search results in the dialog box;

receiving selection of a particular complex data string from search results including the initial search results and the additional search results; and in response to the selection, displaying the particular complex data string in the widget and removing the dialog box from the user interface.

* * * * *